(12) United States Patent
Meyer Timmerman Thijssen et al.

(10) Patent No.: US 10,564,332 B2
(45) Date of Patent: Feb. 18, 2020

(54) CONTROLLING GRATING OUTCOUPLING STRENGTH FOR AR WAVEGUIDE COMBINERS

(71) Applicant: Applied Materials, Inc., Santa Clara, CA (US)

(72) Inventors: Rutger Meyer Timmerman Thijssen, Sunnyvale, CA (US); Wayne McMillan, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 111 days.

(21) Appl. No.: 15/880,693

(22) Filed: Jan. 26, 2018

(65) Prior Publication Data

US 2019/0235142 A1   Aug. 1, 2019

(51) Int. Cl.
| | |
|---|---|
| *G02B 5/18* | (2006.01) |
| *G02B 27/01* | (2006.01) |
| *F21V 8/00* | (2006.01) |
| *G02B 27/00* | (2006.01) |

(52) U.S. Cl.
CPC ......... *G02B 5/1819* (2013.01); *G02B 5/1852* (2013.01); *G02B 6/0016* (2013.01); *G02B 6/0038* (2013.01); *G02B 27/0081* (2013.01); *G02B 27/0172* (2013.01); *G02B 2027/0125* (2013.01); *G02B 2027/0174* (2013.01); *G02B 2207/109* (2013.01)

(58) Field of Classification Search
CPC .. G02B 5/1819; G02B 6/0016; G02B 6/0038; G02B 27/0172; G02B 5/1852; G02B 2207/109; G02B 2027/0125; G02B 5/18; G02B 5/1814; G02B 5/1861; G02B 5/1866; G02B 5/1871; G02B 5/1876; G02B 27/0081; G02B 2027/0174; G02B 5/1847

USPC ........................................................ 359/569
See application file for complete search history.

(56) References Cited

U.S. PATENT DOCUMENTS

| | | | |
|---|---|---|---|
| 7,554,734 B1 * | 6/2009 | Holm | G02B 5/1833 359/569 |
| 9,513,480 B2 | 12/2016 | Saarikko et al. | |
| 9,726,794 B2 | 8/2017 | Boyraz | |
| 2010/0177388 A1 | 7/2010 | Cohen et al. | |

(Continued)

FOREIGN PATENT DOCUMENTS

| | | |
|---|---|---|
| CN | 102272643 B | 10/2013 |
| WO | 2016/141372 A1 | 9/2016 |

OTHER PUBLICATIONS

PCT Notification of Transmittal of the International Search Report and the Written Opinion of the International Searching Authority for International Application No. PCT/US2018/057096; dated Mar. 11, 2019; 19 total pages.

(Continued)

*Primary Examiner* — William R Alexander
*Assistant Examiner* — Henry A Duong
(74) *Attorney, Agent, or Firm* — Patterson + Sheridan LLP (57) ABSTRACT

Embodiments described herein relate to augmented waveguide regions. The augmented waveguide regions generally include pluralities of gratings having duty cycles and refractive indices. In certain embodiments, the duty cycles are different, the refractive indices are different, or both the duty cycles and the refractive indices are different. Also described herein are methods for forming the augmented waveguide regions.

20 Claims, 9 Drawing Sheets

(56) References Cited

U.S. PATENT DOCUMENTS

2016/0327705 A1* 11/2016 Simmonds ......... G02B 27/0081
2017/0168209 A1* 6/2017 Shin ..................... G02B 6/00
2018/0292653 A1* 10/2018 Tervo .................... G02B 6/34

OTHER PUBLICATIONS

Taiwanese Office Action dated Oct. 8, 2019, for Taiwanese Patent Application No. 107137673, 7 pages.

* cited by examiner

CONTROLLING GRATING OUTCOUPLING STRENGTH FOR AR WAVEGUIDE COMBINERS

BACKGROUND

Field

Embodiments of the present disclosure generally relate to augmented reality waveguides. More specifically, embodiments described herein relate to augmented waveguide regions for controlling out-coupling strengths of augmented reality waveguides.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is displaying a virtual image overlaid on an ambient environment. Augmented waveguide combiners are used to assist in overlaying images. Generated light is in-coupled into an augmented waveguide combiner, propagated through the augmented waveguide combiner, out-coupled from the augmented waveguide combiner, and overlaid on the ambient environment. Light is coupled into and out of augmented waveguide combiners using surface relief gratings. The intensity of the out-coupled may not be adequately controlled.

Accordingly, what is needed in the art are improved augmented waveguides combiners and methods of fabrication.

SUMMARY

In one embodiment, a device is provided. The device includes at least one first grating formed on a substrate having a first duty cycle, at least one second grating formed on the substrate adjacent to the at least one first grating having a second duty cycle different than the first duty cycle, and at least one third grating formed on the substrate adjacent to the at least one second grating having a second duty cycle different than the first duty cycle and the second duty cycle.

In another embodiment, a device is provided. The device includes at least one first grating formed on a substrate having a first refractive index, at least one second grating formed on the substrate adjacent to the at least one first grating having a second refractive index greater than the first refractive index, and at least one third of grating formed on the substrate adjacent to the at least one second grating having a third refractive index greater than the second refractive index.

In yet another embodiment, a method is provided. The method includes depositing one or more first materials onto a substrate, depositing one or more second materials onto a substrate, imprinting a stamp into the one or more first materials and the one or more second materials, curing the one or more first materials and the one or more second materials, and releasing the stamp to form a first grating of the one or more first materials and a second grating of the one or more second materials. The first grating has a first refractive index and a first duty cycle. The second grating has a second refractive index and a second duty cycle. Either the first duty cycle is different from the second duty cycle, the first refractive index is different from the second refractive index, or both the first refractive index and the first duty cycle are different from the second refractive index and the second duty cycle.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments described herein relate to augmented waveguide regions. The augmented waveguide regions generally include pluralities of gratings having duty cycles and refractive indices. In certain embodiments, the duty cycles are different, the refractive indices are different, or both the duty cycles and the refractive indices are different. Also described herein are methods for forming the augmented waveguide regions.

Figure 1:
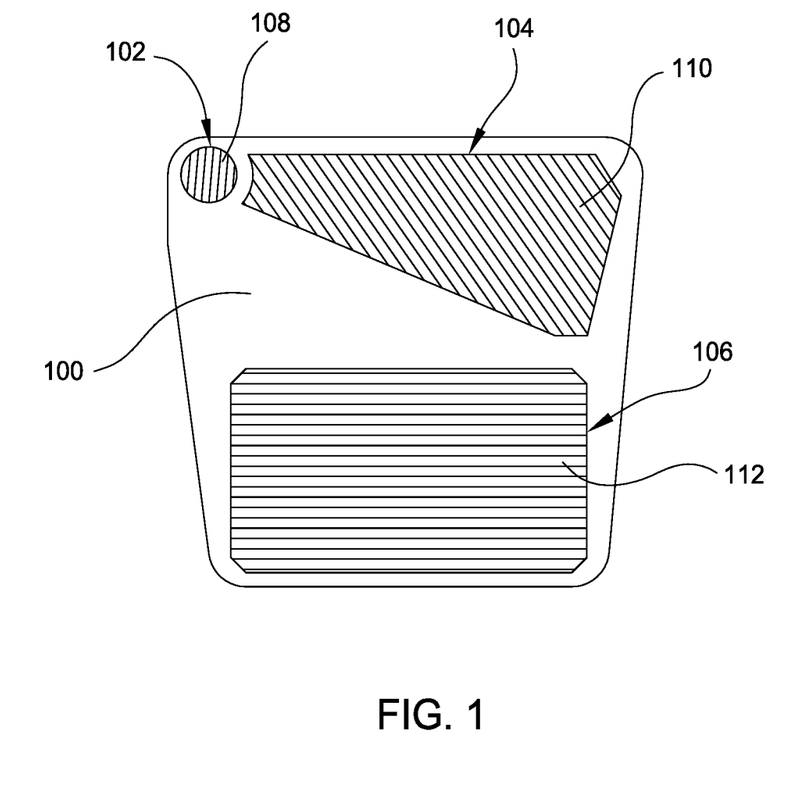
FIG. 1 is a perspective, frontal view of an augmented waveguide combiner according to an embodiment.

FIG. 1 is a perspective, frontal view of an augmented waveguide combiner 100. It is to be understood that the augmented waveguide combiner 100 described below is an exemplary augmented waveguide combiner and other augmented waveguide combiners may be used with or modified to accomplish aspects of the present disclosure.

The augmented waveguide combiner 100 includes an input coupling region 102 defined by a first plurality gratings 108, an intermediate region 104 defined by a second plurality of gratings 110, and an output coupling region 106 defined by a third plurality of gratings 112. The input coupling region 102 receives incident beams of light (a virtual image) having an intensity from a microdisplay. Each grating of the plurality of gratings 108 splits the incident beams into a plurality of modes, each beam having a mode. Zero-order mode (T0) beams are refracted back or lost in the augmented waveguide combiner 100, positive first-order mode (T1) beams are coupled though the augmented waveguide combiner 100 to the intermediate region 104, and negative first-order mode (T-1) beams propagate in the augmented waveguide combiner 100 a direction opposite to the T1 beams. Ideally, the incident beams are split into T1 beams that have all of the intensity of the incident beams in order to direct the virtual image to the intermediate region 104. In one embodiment, the each grating of the plurality of gratings 108 is angled to suppress the T-1 beams and the T0 beams. The T1 beams undergo total-internal-reflection (TIR) through the augmented waveguide combiner 100 until the T1 beams come in contact with the second plurality of gratings 110 in the intermediate region 104.

The T1 beams contact a grating of the plurality of gratings 110. The T1 beams are split into T0 beams refracted back or lost in the augmented waveguide combiner 100, T1 beams that undergo TIR in the intermediate region 104 until the T1 beams contact another grating of the plurality of gratings 110, and T-1 beams that are coupled through the augmented waveguide combiner 100 to the output coupling region 106. The T1 beams that undergo TIR in the intermediate region 104 continue to contact gratings of the plurality of gratings 110 until the either the intensity of the T1 beams coupled through the augmented waveguide combiner 100 to the intermediate region 104 is depleted, or remaining T1 beams propagating through the intermediate region 104 reach the end of the intermediate region 104. The plurality of gratings 110 must be tuned to control the T1 beams coupled through the augmented waveguide combiner 100 to the intermediate region 104 in order to control the intensity of the T-1 beams coupled to the output coupling region 106 to modulate a field of view of the virtual image produced from the microdisplay from a user's perspective and increase a viewing angle from which a user can view the virtual image.

The T-1 beams coupled through the augmented waveguide combiner 100 to the output coupling region 106 undergo TIR in the augmented waveguide combiner 100 until the T-1 beams contact a grating of the plurality of gratings 112 where the T-1 beams are split into T0 beams refracted back or lost in the augmented waveguide combiner 100, T1 beams that undergo TIR in the output coupling region 106 until the T1 beams contact another grating of the plurality of gratings 112, and T-1 beams coupled out of the augmented waveguide combiner 100. The T1 beams that undergo TIR in the output coupling region 106 continue to contact gratings of the plurality of gratings 112 until the either the intensity of the T-1 beams coupled through the augmented waveguide combiner 100 to the output coupling region 106 is depleted, or remaining T1 beams propagating through the output coupling region 106 have reached the end of the output coupling region 106. The plurality of gratings 112 must be tuned to control the T-1 beams coupled through the augmented waveguide combiner 100 to the output coupling region 106 in order to control the intensity of the T-1 beams coupled out of the augmented waveguide combiner 100 to further modulate the field of view of the virtual image produced from the microdisplay from the user's perspective and further increase the viewing angle from which the user can view the virtual image.

Figure 2:
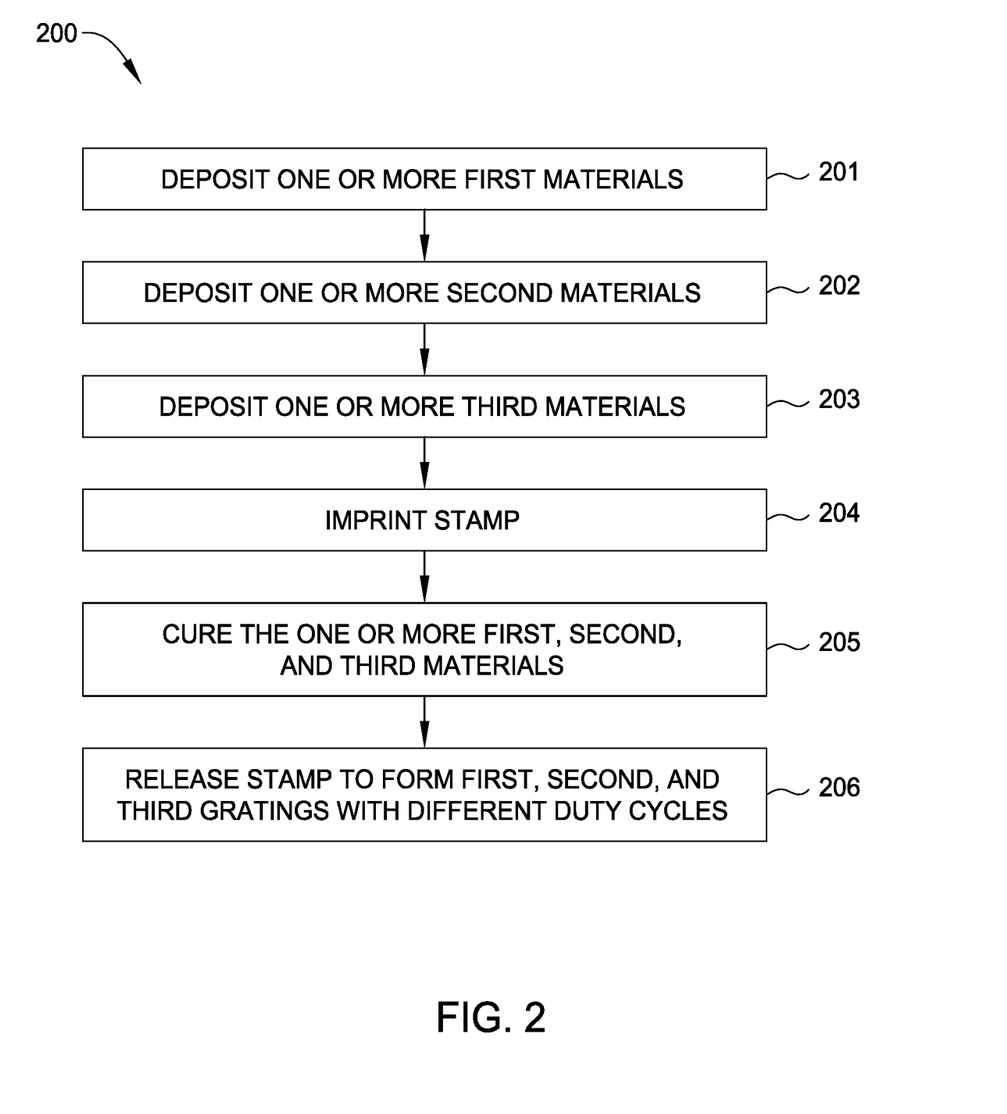
FIG. 2 is a flow chart illustrating operations of a method for forming an augmented waveguide region according to an embodiment.
Figure 3A:
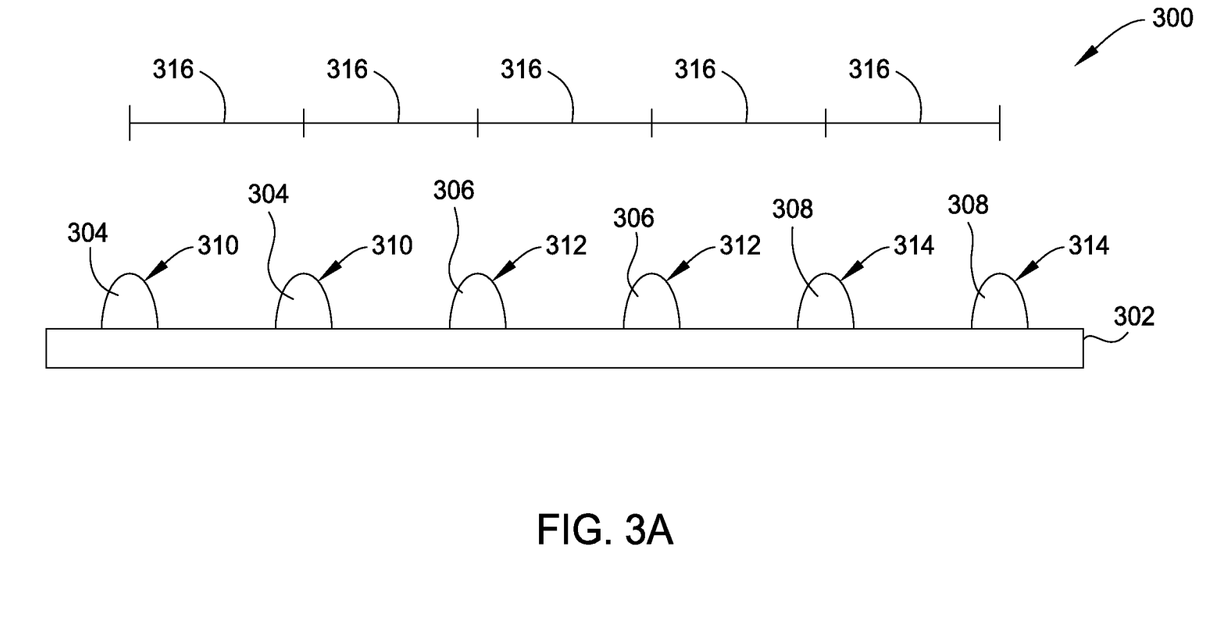
FIGS. 3A-3D are schematic, cross-sectional views of an augmented waveguide region during fabrication according to an embodiment.

FIG. 2 is a flow diagram illustrating operations of a method 200 for forming an augmented waveguide region 300 shown in FIGS. 3A-3D. At operation 201, one or more first materials 304 are deposited onto a substrate 302. As shown in FIG. 3A, the one or more first materials 304 may be droplets 310 deposited on the substrate 302 by an inkjet printer. The droplets 310 have a first volume and a first radius. The inkjet printer deposits the droplets 310 at intervals 316. In one embodiment, the intervals 316 are substantially equal such that the droplets 310 are equally spaced. In another embodiment, the intervals 316 are different such that spaces between droplets 310 are different. The substrate 302 has a surface wetness that may result in the droplets 310 having a first lateral extension at a first given thickness over time.

The one or more first materials 304 may include a first solution. The first solution may be a sol-gel solution or a nanoparticle solution. The first solution may include silicon dioxide ($SiO_2$), silicon oxycarbide (SiOC), zirconium dioxide ($ZrO_2$), and/or titanium dioxide ($TiO_2$). Proportions of $SiO_2$, SiOC, $ZrO_2$, and/or $TiO_2$ in the first solution are controlled to result in a first refractive index. For example, the first solution may contain a first ratio of $TiO_2$ to $SiO_2$, SiOC, and/or $ZrO_2$. In one embodiment, sol-gel precursors for $SiO_2$ may include tetramethyl orthosilicate (TMOS), methyl-tri-methoxy-silane (MTMS), and tetraethyl orthosilicate (TEOS).

At operation 202, one or more second materials 306 are deposited onto the substrate 302. As shown in FIG. 3A, the one or more second materials 306 may be droplets 312 deposited on the substrate 302 by the inkjet printer. The droplets 312 have a second volume and a second radius. In one embodiment, the second volume and the second radius are different than the first volume and the first radius. In another embodiment the second volume and the second radius are substantially equal to the first volume and the first radius. The inkjet printer deposits the droplets 312 at the intervals 316. In one embodiment, the intervals 316 are substantially equal such that the droplets 312 are equally spaced. In another embodiment, the intervals 316 are different such that spaces between droplets 312 are different. The substrate 302 has the surface wetness that may result in the droplets 312 having a second lateral extension at a second given thickness over time.

The one or more second materials 306 may include a second solution. The second solution may be a sol-gel solution or a nanoparticle solution. The second solution may include $SiO_2$, SiOC, $ZrO_2$, and/or $TiO_2$. Proportions of $SiO_2$, SiOC, $ZrO_2$, and/or $TiO_2$ in the second solution are controlled to result in a second refractive index. The second refractive index may be different than the first refractive index. For example, the second solution may contain a second ratio having a higher ratio of $TiO_2$ to $SiO_2$, SiOC, and/or $ZrO_2$ than the first ratio to result in the second refractive index having a higher refractive index than the first refractive index or the second ratio may have a lower ratio of $TiO_2$ to $SiO_2$, SiOC, and/or $ZrO_2$ than the first ratio to result in the second refractive index having a lower refractive index than the first refractive index.

At operation 203, one or more third materials 308 are deposited onto a substrate 302. As shown in FIG. 3A, the one or more third materials 308 may be droplets 314 deposited on the substrate 302 by the inkjet printer. The droplets 314 have a third volume and a third radius. In one embodiment, the third volume and third radius are different than the first volume and the first radius and the second volume and the second radius. In another embodiment, the second volume and the second radius are substantially equal to the first volume and the first radius and the second volume and the second radius. The inkjet printer deposits the droplets 314 at the intervals 316. In one embodiment, the intervals 316 are substantially equal such that the droplets 314 are equally spaced. In another embodiment, the intervals 316 are different such that spaces between droplets 314 are different. The substrate 302 has the surface wetness that may result in the droplets 314 having a third lateral extension at a third given thickness over time.

The one or more third materials 308 may include a third solution. The third solution may be a sol-gel solution or a nanoparticle solution. The third solution may include $SiO_2$, SiOC, $ZrO_2$, and/or $TiO_2$. Proportions of $SiO_2$, SiOC, $ZrO_2$, and/or $TiO_2$ in the third solution are controlled to result in a third refractive index. The third refractive index may be different than the first refractive index and the second refractive index. For example, the third solution may contain a third ratio having a higher ratio of $TiO_2$ to $SiO_2$, SiOC, and/or $ZrO_2$ than the first ratio and the second ratio to result in the third refractive index having a higher refractive index than the first refractive index and second refractive index or the third ratio may have a lower ratio of $TiO_2$ to $SiO_2$, SiOC, and/or $ZrO_2$ than the first ratio and the second ratio to result in a the third refractive index having a lower refractive index than the first refractive index and second refractive index.

Figure 3B:
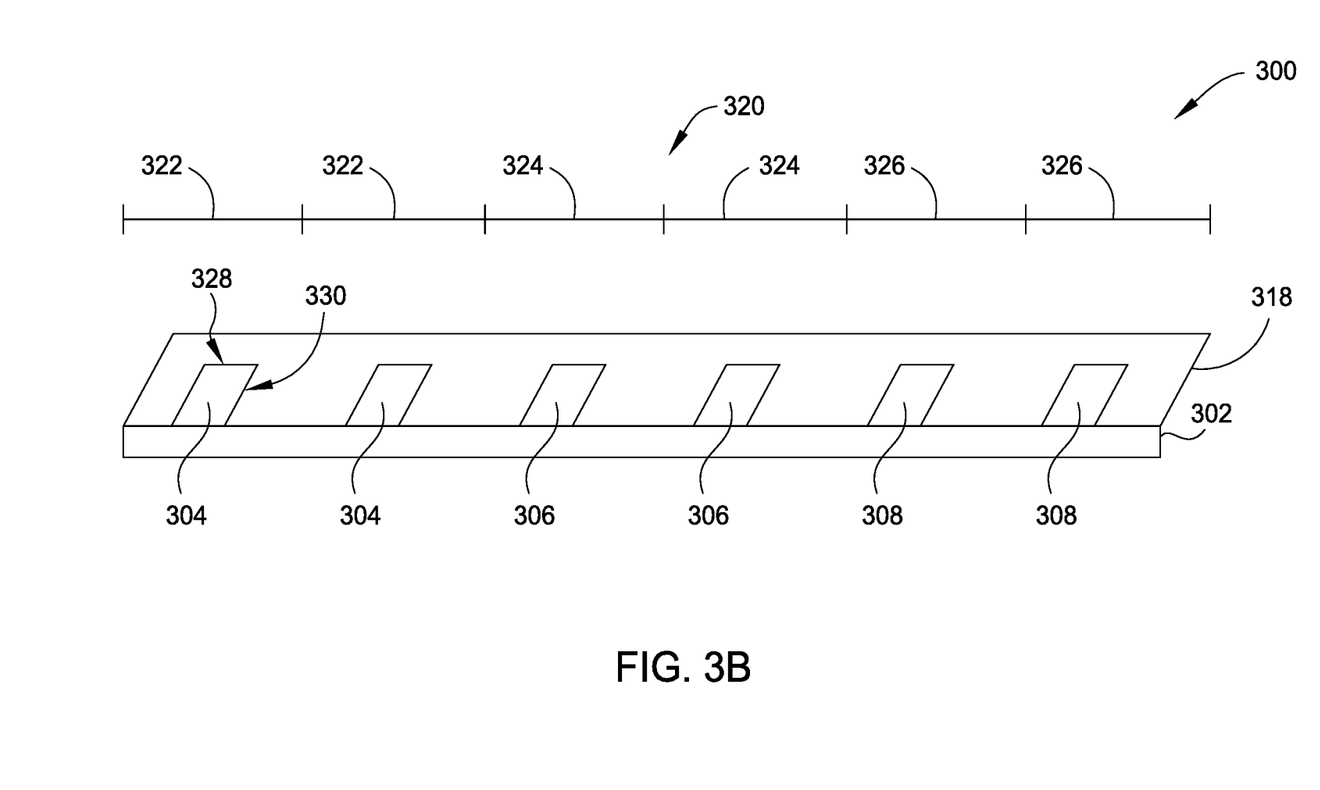

At operation 204, a stamp 318 is imprinted into the one or more first materials 304, the one or more second materials 306, and the one or more third materials 308. As shown in FIG. 3B, the stamp 318 has a positive pattern 320 than includes one or more first grating patterns 322 corresponding to the one or more first materials 304, one or more second grating patterns 324 corresponding to the one or more second materials 306, and one or more third grating patterns 326 corresponding to the one or more third materials 308. The one or more first, second, and third grating patterns 322, 324, 326 include top pattern surfaces 328 parallel to the substrate 302 and sidewall pattern surfaces 330. The sidewall pattern surfaces 330 may be slanted relative to the substrate 302 or oriented normal to the substrate 302. In one embodiment, the stamp 318 is fabricated from a master having a negative pattern that includes one or more inverse first grating patterns, one or more second inverse second grating patterns, and one or more third inverse grating patterns. The stamp 318 is molded from the master. In another embodiment, the stamp 318 is the master.

At operation 205, the one or more first materials 304, the one or more second materials 306, and the one or more third materials 308 are cured. The stamp 318 may comprise a semi-transparent material such as fused silica or polydimethylsiloxane (PDMS) to allow the one or more first, second, and third materials 304, 306, 308 to be cured by exposure to ultraviolet (UV) light. The one or more first, second, and third materials 304, 306, 308 may alternatively be thermally cured.

Figure 3C:
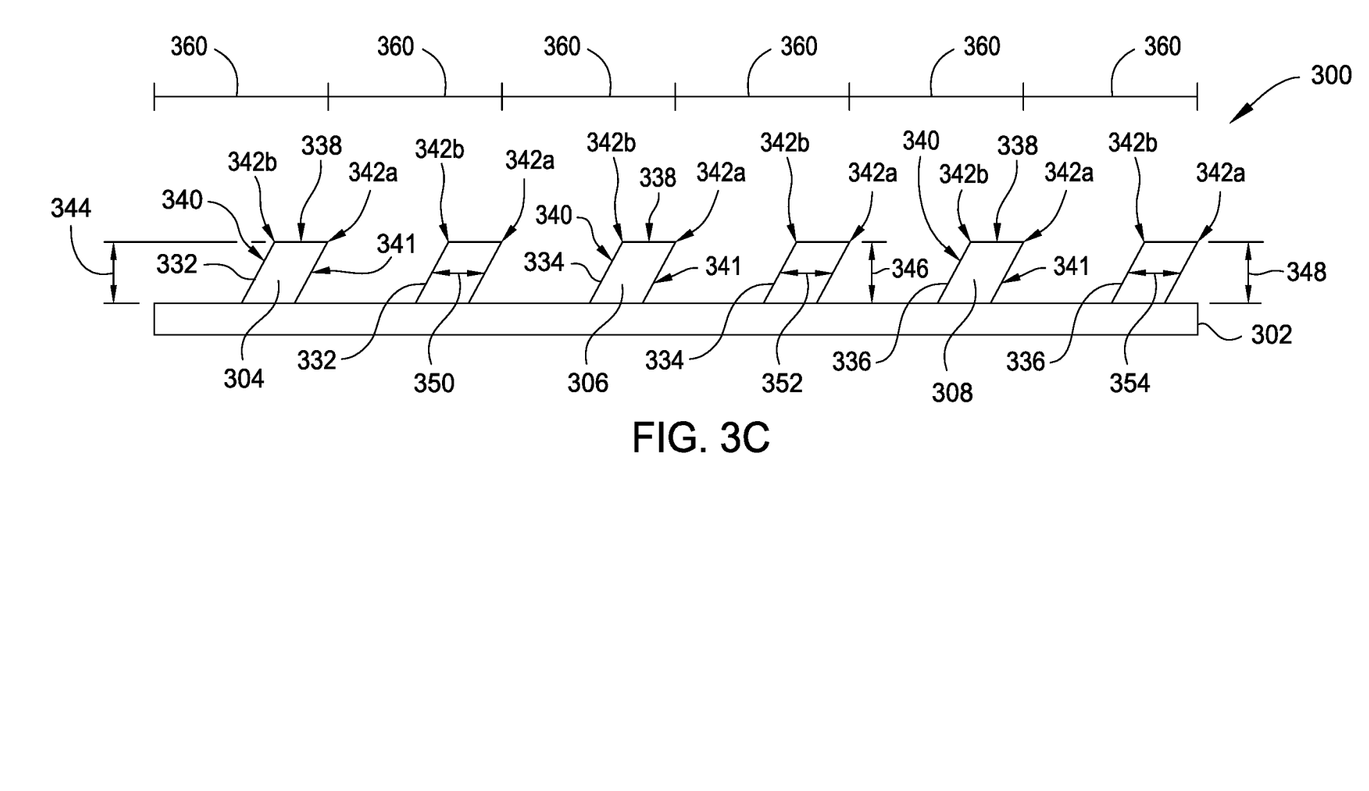

At operation 206, the stamp 318 is released to form the augmented waveguide region 300 having first gratings 332 of the one or more first materials 304, second gratings 334 of the one or more second materials 306, and third gratings 336 of the one or more third materials 308. In one embodiment, the stamp 318 can be mechanically removed as the stamp 318 may be coated with a mono-layer of anti-stick surface treatment coating, such as a fluorinated coating. In another embodiment, the stamp 318 may comprise a water soluble material, such as a polyvinyl alcohol (PVA) material, that is water soluble in order for the stamp 318 to be removed by dissolving the stamp 318 in water.

Figure 3D:
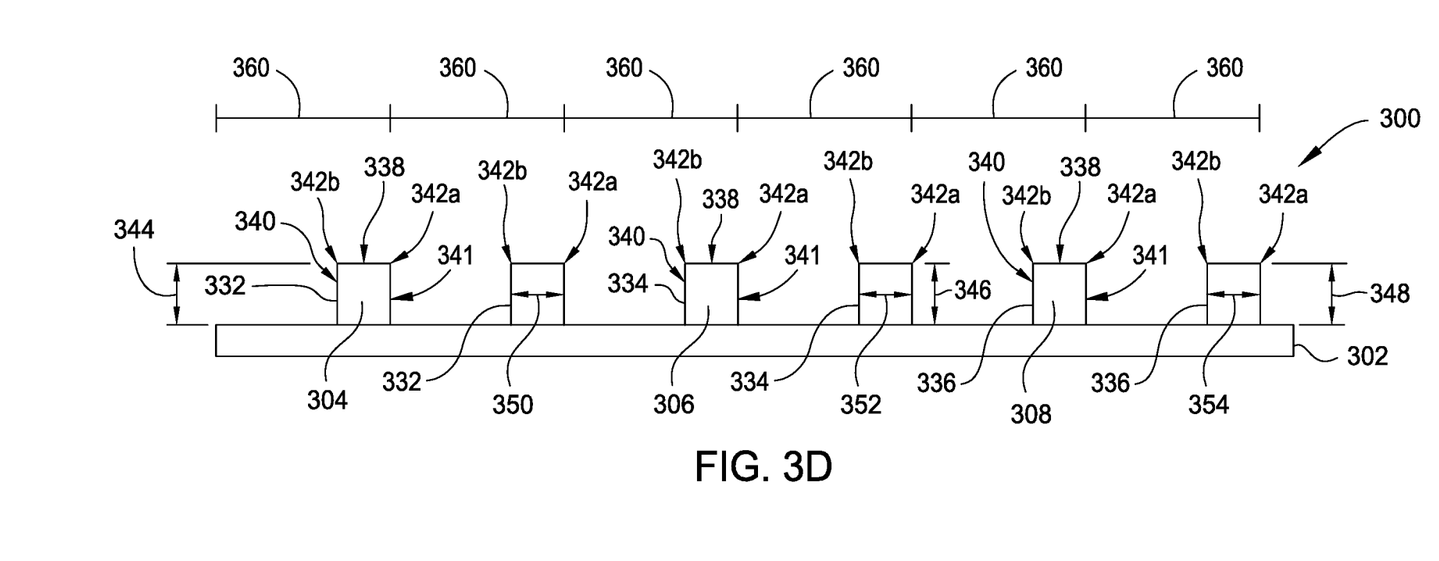

FIG. 3C and FIG. 3D illustrate schematic, cross-sectional views of the augmented waveguide region 300. The first gratings 332 include top surfaces 338 parallel to the substrate 302 having a first edge 342a and a second edge 342b, first sidewalls 340, second sidewalls 341, and heights 344 extending from the top surfaces 338 to the substrate 302. The first sidewalls 340 and the second sidewalls 341 may be slanted relative to the substrate 302 or oriented normal to the substrate 302. The second gratings 334 include the top surfaces 338 parallel to the substrate 302 having the first edge 342a and the second edge 342b, the first sidewalls 340, the second sidewalls 341, and heights 346 extending from the top surfaces 338 to the substrate 302. The third gratings 336 include the top surfaces 338 parallel to the substrate 302 having the first edge 342a and the second edge 342b, the first sidewalls 340, the second sidewalls 341, and heights 348 extending from the top surfaces 338 to the substrate 302. The heights 344, 346, 348 may be substantially equal.

The first gratings 332 have first linewidths 350 at half of the heights 344 from the first sidewalls 340 to the second sidewalls 341. The second gratings 334 have second linewidths 352 at half of the heights 346 from the first sidewalls 340 to the second sidewalls 341. In one embodiment, the second linewidths 352 are different than the first linewidths 350. The third gratings 336 have third linewidths 354 at half of the heights 348 from the first sidewalls 340 to the second sidewalls 341. In one embodiment, the third linewidths 354 are different than the second linewidths 352 and the first linewidths 350.

The first, second, and third gratings 332, 334, 336 have pitches 360. The pitches 360 are determined from distances between first edges 342a. The first gratings 332 have a first duty cycle determined by dividing the first linewidths 350 by the pitches 360. The second gratings 334 have a second duty cycle determined by dividing the second linewidths 352 by the pitches 360. The third gratings 336 have a third duty cycle determined by dividing the third linewidths 354 by the pitches 360.

In one embodiment, the droplets 310, 312, 314 are deposited at the intervals 316 that are substantially equal. The droplets 310, 312, 314 have different volumes and radii. Thus, the first duty cycle, second duty cycle, and third duty cycle are different because the first linewidths 350, the second linewidths 352, and the third linewidths 354 are different while the pitches 360 are substantially equal. In another embodiment, the droplets 310, 312, 314 are deposited at intervals 316 that are different. The droplets 310, 312, 314 may have different volumes and radii or substantially equal volumes and radii. Thus, the first duty cycle, second duty cycle, and third duty cycle are different because the pitches 360 are different.

To modulate the field of view of the virtual image produced from the microdisplay from the user's perspective and increase the viewing angle from which the user can view the virtual image, the intensity of the beams out-coupled from the augmented waveguide region 300 must increase while the intensity of the beams propagating through the augmented waveguide region 300 must decrease.

Furthermore, the intensity of the beams out-coupled should not increase to a point where the intensity of the beams propagating through the augmented waveguide region 300 is depleted before the beams propagating through the augmented waveguide region 300 reach a last grating of the augmented waveguide region 300. Ideally, the intensity of the out-coupled beams increases while the intensity of the beams of the propagating through the augmented waveguide region 300 decreases and is depleted by the last grating of the augmented waveguide region 300.

In order to control the coupling of light of the augmented waveguide region 300 the first duty cycle, second duty cycle, and third duty cycle are different. In one embodiment, the first duty cycle is between about 0.1 and about 0.25, the second duty cycle is greater than the first duty cycle and is between about 0.2 and about 0.35, and the third duty cycle is greater than the first duty cycle and second duty cycle and is between about 0.3 to about 0.5. The first gratings 332 have the first refractive index, the second gratings 334 have the second refractive index, and the third gratings 336 have the third refractive index. The first, second, and third refractive indices may be different as the proportions of $SiO_2$, SiOC, $ZrO_2$, and/or $TiO_2$ in the one or more first materials, one or more second materials, and the one or more third materials may be different in order to further control the coupling of light of the augmented waveguide region 300. The first, second, and third refractive indices may be between about 1 and about 2.5, and the second refractive index may be greater than the first refractive index and the third refractive may be greater than the first refractive index and the second refractive index.

Figure 4:
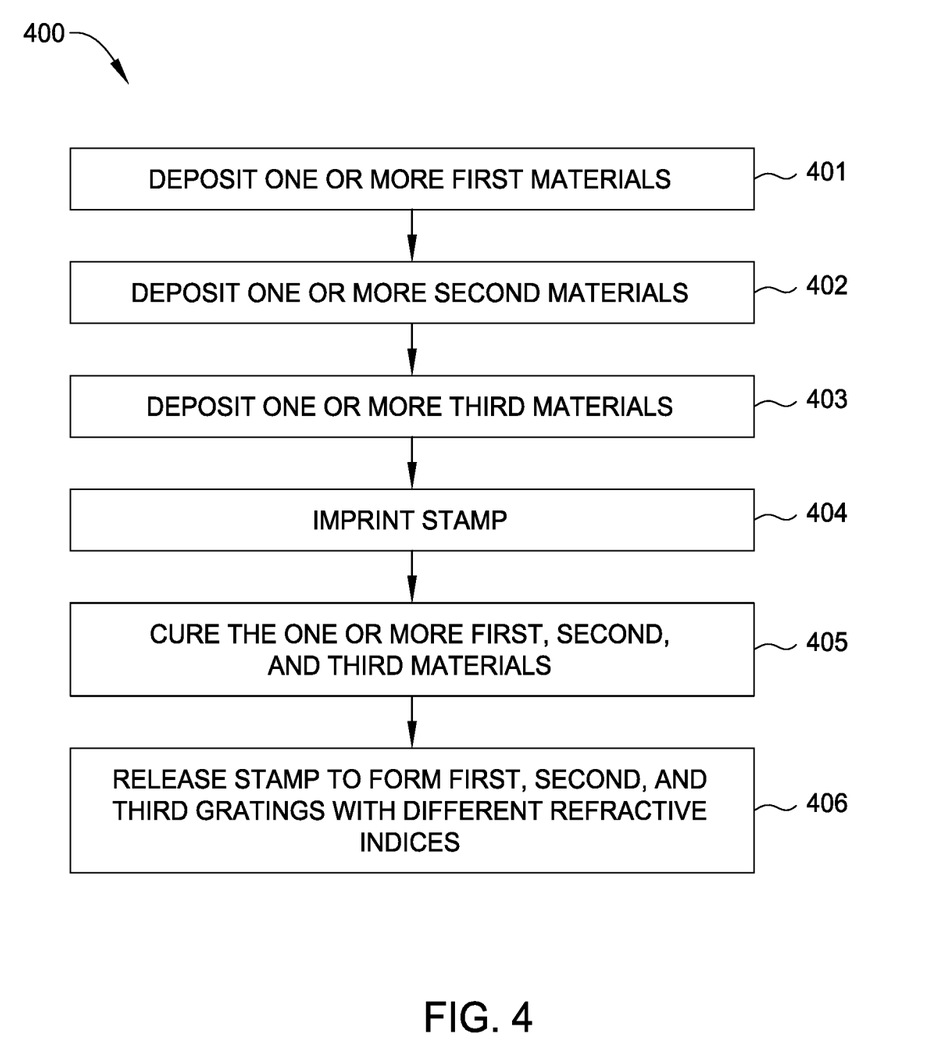
FIG. 4 is a flow chart illustrating operations of a method for forming an augmented waveguide region according to another embodiment.
Figure 5A:
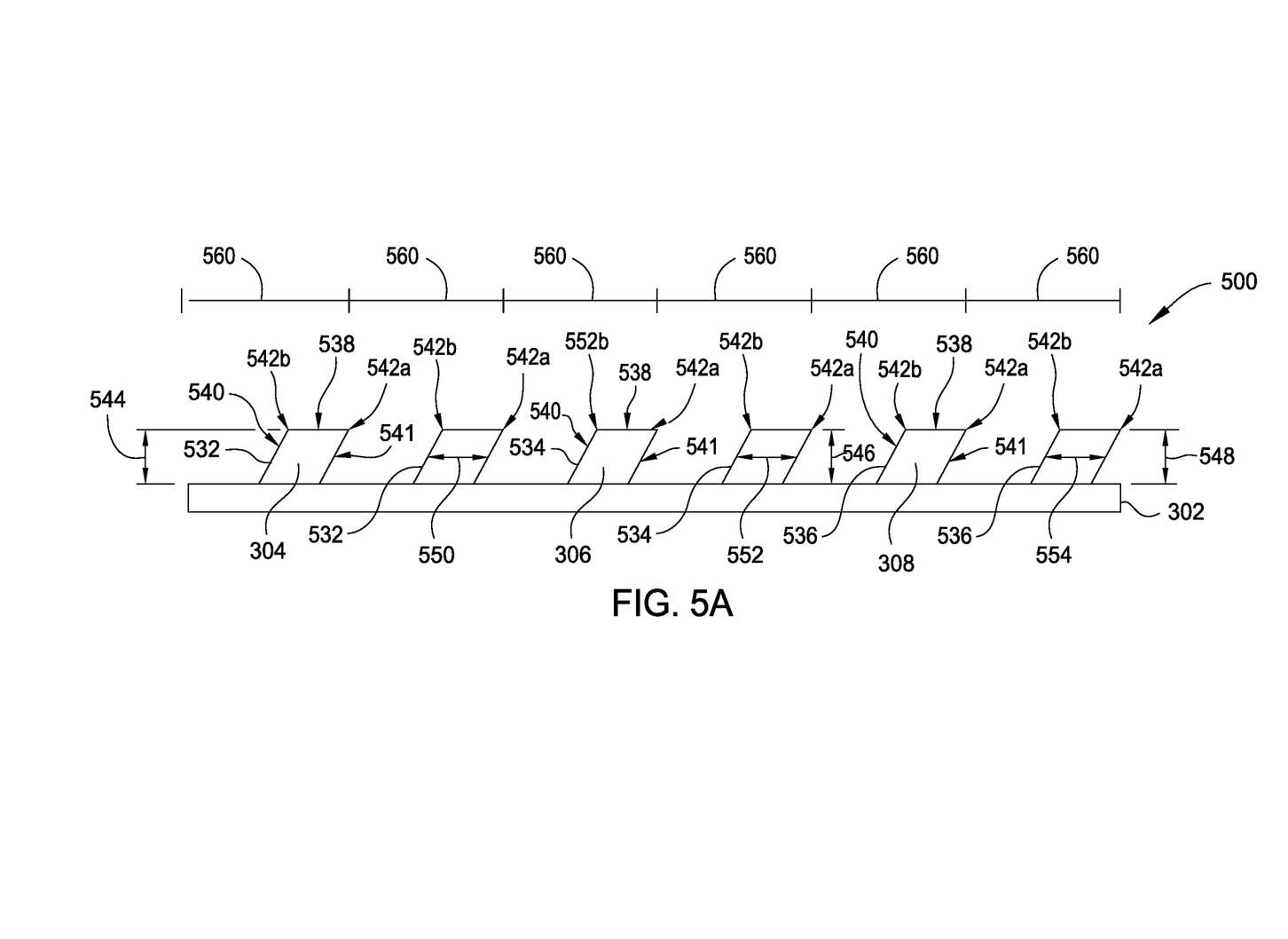
FIGS. 5A-5B are schematic, cross-sectional views of an augmented waveguide region during fabrication according to another embodiment.
Figure 5B:
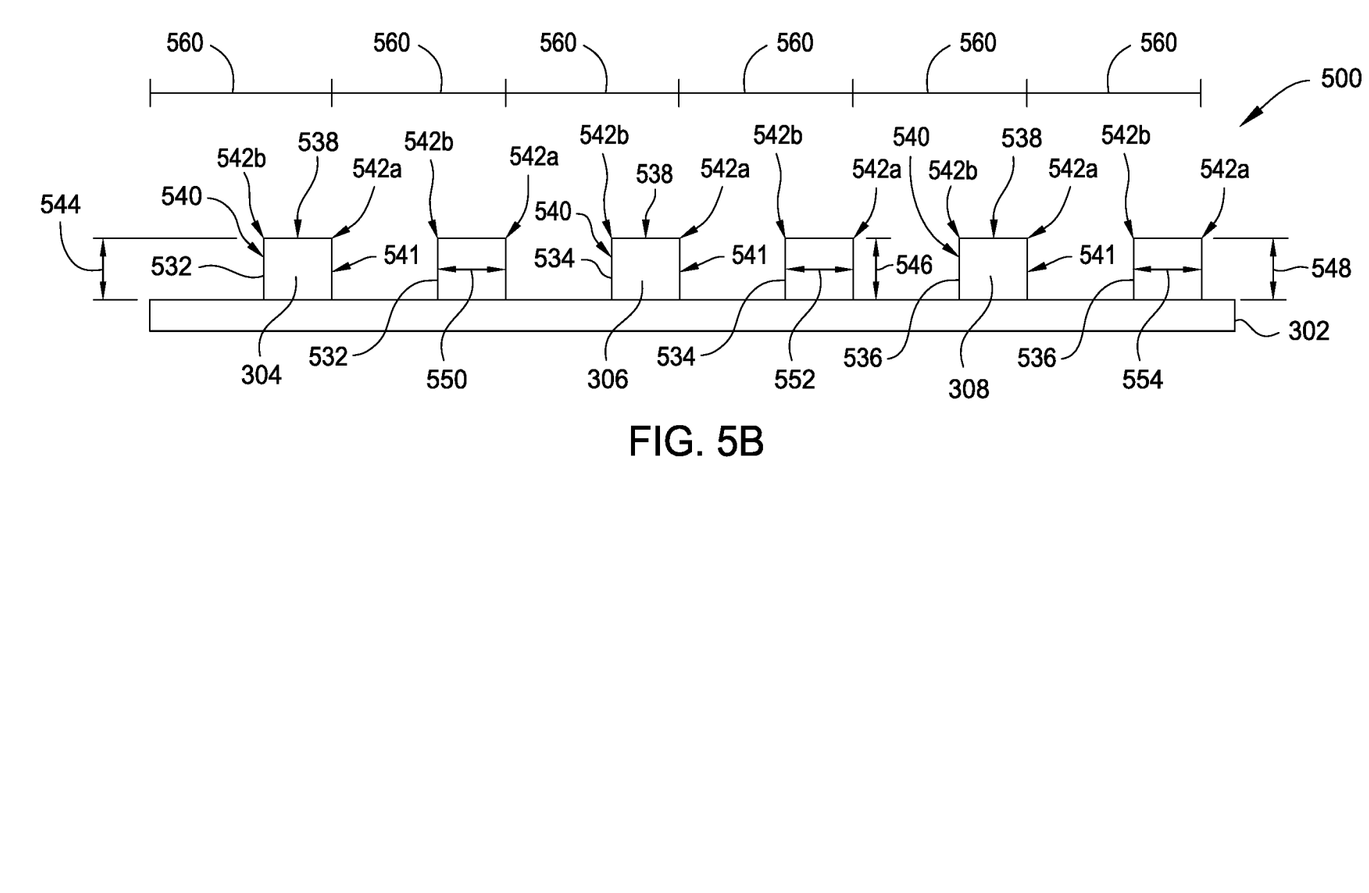

FIG. 4 is a flow diagram illustrating operations of a method 400 for forming an augmented waveguide region 500 shown in FIGS. 5A-5B. Operations 401-405 of the method 400 for forming the augmented waveguide region 500 are illustrated in FIGS. 3A and 3B. At operation 401, one or more first materials 304 are deposited onto a substrate 302. As shown in FIG. 3A, the one or more first materials 304 may be droplets 310 deposited on the substrate 302 by an inkjet printer. The droplets 310 have a first volume and a first radius. The inkjet printer deposits the droplets 310 at intervals 316. In one embodiment, the intervals 316 are substantially equal such that the droplets 310 are equally spaced. In another embodiment, the intervals 316 are different such that spaces between droplets 310 are different.

The one or more first materials 304 may include a first solution. The first solution may be a sol-gel solution or a nanoparticle solution. The first solution may include silicon dioxide ($SiO_2$), silicon oxycarbide (SiOC), zirconium dioxide ($ZrO_2$), and/or titanium dioxide ($TiO_2$). Proportions of $SiO_2$, SiOC, $ZrO_2$, and/or $TiO_2$ in the first solution are controlled to result in a first refractive index. The first solution contains a first ratio of $TiO_2$ to $SiO_2$, SiOC, and/or $ZrO_2$.

At operation 402, one or more second materials 306 are deposited onto a substrate 302. As shown in FIG. 3A, the one or more second materials 306 may be droplets 312 deposited on the substrate 302 by the inkjet printer. The droplets 312 have a second volume and a second radius. In one embodiment, the second volume and the second radius are substantially equal to the first volume and the first radius. In another embodiment the second volume and second radius are different than the first volume and the first radius. The inkjet printer deposits the droplets 312 at the intervals 316. In one embodiment, the intervals 316 are substantially equal such that the droplets 312 are equally spaced. In another embodiment, the intervals 316 are different such that spaces between droplets 312 are different.

The one or more second materials 306 may include a second solution. The second solution may be a sol-gel solution or a nanoparticle solution. The second solution may include $SiO_2$, SiOC, $ZrO_2$, and/or $TiO_2$. Proportions of $SiO_2$, SiOC, $ZrO_2$, and/or $TiO_2$ in the second solution are controlled to result in a second refractive index. The second refractive index is different than the first refractive index. The second solution contains a second ratio having higher ratio of $TiO_2$ to $SiO_2$, SiOC, and/or $ZrO_2$ than the first ratio to result in the second refractive index having a higher refractive index than the first refractive index or the second ratio has a lower ratio of $TiO_2$ to $SiO_2$, SiOC, and/or $ZrO_2$ than the first ratio to result in the second refractive index having a lower refractive index than the first refractive index.

At operation 403, one or more third materials 308 are deposited onto a substrate 302. As shown in FIG. 3A, the one or more third materials 308 may be droplets 314 deposited on the substrate 302 by the inkjet printer. The droplets 314 have a third volume and a third radius. In one embodiment, the third volume and third radius are substantially equal to the first volume and the first radius and the second volume and the second radius. In another embodiment, the second volume and the second radius are different than to the first volume and the first radius and the second volume and the second radius. The inkjet printer deposits the droplets 314 at the intervals 316. In one embodiment, the intervals 316 are substantially equal such that the droplets 314 are equally spaced. In another embodiment, the intervals 316 are different such that spaces between droplets 314 are different.

The one or more third materials 308 may include a third solution. The third solution may be a sol-gel solution or a nanoparticle solution. The third solution may include $SiO_2$, SiOC, $ZrO_2$, and/or $TiO_2$. Proportions of $SiO_2$, SiOC, $ZrO_2$, and/or $TiO_2$ in the third solution are controlled to result in a third refractive index. The third refractive index is different than the first refractive index and second refractive index. The solution may contain a third ratio having a higher ratio of $TiO_2$ to $SiO_2$, SiOC, and/or $ZrO_2$ than the first ratio and second ratio to result in the third refractive index having a higher refractive index than the first refractive index and second refractive index or the third ratio has a lower ratio of $TiO_2$ to $SiO_2$, SiOC, and/or ZrO than the first ratio and second ratio to result in the third refractive index having a lower refractive index than the first refractive index and second refractive index.

At operation 404, a stamp 318 is imprinted into the one or more first materials 304, the one or more second materials 306, and the one or more third materials 308. At operation 405, the one or more first materials 304, the one or more second materials 306, and the one or more third materials 308 are cured. At operation 406, the stamp 318 is released to form the augmented waveguide region 500 having first gratings 532 of the one or more first materials 304, second gratings 534 of the of the one or more second materials 306, and third grating 536 of the one or more third materials 308.

FIG. 5A and FIG. 5B illustrate schematic, cross-sectional views of the augmented waveguide region 500. The first gratings 532 include top surfaces 538 parallel to the substrate 302 having a first edge 542 a and a second edge 542 b, first sidewalls 540, second sidewalls 541, and heights 544 extending from the top surfaces 538 to the substrate 302. The first sidewalls 540 and the second sidewalls 541 may be slanted relative to the substrate 302 or oriented normal to the substrate 302. The second gratings 534 include the top surfaces 538 parallel to the substrate 302 having the first edge 542 a and the second edge 542 b, the first sidewalls 540, the second sidewalls 541, and heights 546 extending from the top surfaces 538 to the substrate 302. The third gratings 536 include the top surfaces 538 parallel to the substrate 302 having the first edge 542a and the second edge 542b, the first sidewalls 540, the second sidewalls 541, and heights 548 extending from the top surfaces 538 to the substrate 302. The heights 544, 546, 548 may be substantially equal.

The first gratings 532 have first linewidths 550 at half of the heights 544 from the first sidewalls 540 to the second sidewalls 541. The second gratings 534 have second linewidths 552 at half of the heights 546 from the first sidewalls 540 to the second sidewalls 541. The third gratings 536 have third linewidths 554 at half of the heights 548 from the first sidewalls 540 to the second sidewalls 541. In one embodiment, the third linewidths 554 are substantially equal to as the second linewidths 552 and the first linewidths 550.

The first, second, and third gratings 532, 534, 536 have pitches 560. The pitches 560 are determined from distances between first edges 542a. The first gratings 532 have a first duty cycle determined by dividing the first linewidths 550 by the pitches 560. The second gratings 534 have a second duty cycle determined by dividing the second linewidths 552 by the pitches 560. The third gratings 536 have a third duty cycle determined by dividing the third linewidths 554 by the pitches 560.

In one embodiment, the third linewidths 554 are substantially equal to the second linewidths 552 and the first linewidths 550 and the pitches 560 are substantially equal due to depositing the droplets 310, 312, 314 with substantially equal volumes and radii at the intervals 316 that are substantially equal. Thus, the first duty cycle, second duty cycle, and third duty cycle are substantially equal because the first linewidths 550, the second linewidths 552, and the third linewidths 554 are substantially equal and the pitches 560 are substantially equal. In another embodiment, the first duty cycle, the second duty cycle, and third duty cycle are substantially equal, yet the first, second, and third linewidths 550, 552, 554 are different and the pitches 560 are different. The first volume and the first radius of the droplets 310, the second volume and the second radius of the droplets 312, and the third volume and the third radius of the droplets 314 are tuned to the pitches 560 to result in the first duty cycle, the second duty cycle, and the third duty cycle being substantially equal. In one embodiment, the first duty cycle, the second duty cycle, and the third duty cycle are between about 0.1 to about 0.5.

The first gratings 332 have the first refractive index, the second gratings 334 have the second refractive index, and the third gratings 336 have the third refractive index. The first, second, and third refractive indices are different as the proportions of $SiO_2$, SiOC, $ZrO_2$, and/or $TiO_2$ in the one or more first materials, the one or more second materials, and the one or more third materials are different in order to control the coupling of light of the augmented waveguide region 500. The first, second, and third refractive indices may be between about 1 and about 2.5. In one embodiment, the first refractive index is between about 1.2 to about 1.5, the second refractive index is greater than the first refractive index and is between about 1.4 and about 1.7, and the third refractive is greater than the first refractive index and the second refractive index and is between about 1.5 and about 2.5.

In summation, augmented waveguide regions including pluralities of gratings having duty cycles and refractive indices and methods for fabricating the same are described herein. Augments waveguide regions having different duty cycles, different refractive indices, or both the different duty cycles and the different refractive indices allow for modulation of the field of view of the virtual image produced from the microdisplay from the user's perspective and an increase in the viewing angle from which the user can view the virtual image. The utilization of different proportions of $SiO_2$, SiOC, $ZrO_2$, and/or $TiO_2$ in the one or more first materials, the one or more second materials, and the one or more third materials provides from different refractive indices and forming gratings having different linewidths provide for different duty cycles.

While the foregoing is directed to examples of the present disclosure, other and further examples of the disclosure may be devised without departing from the basic scope thereof, and the scope thereof is determined by the claims that follow.

What is claimed is:

1. A device comprising:
one or more regions, each of the regions having one or more gratings formed on a substrate, the gratings of at least one region of the one or more regions comprising:
at least one first grating formed on the substrate having a first duty cycle;
at least one second grating formed on the substrate adjacent to the at least one first grating having a second duty cycle different than the first duty cycle; and
at least one third grating formed on the substrate adjacent to the at least one second grating having a third duty cycle different than the first duty cycle and the second duty cycle.

2. The device of claim 1, wherein the first, second, and third duty cycle are between about 0.1 and about 0.5.

3. The device of claim 2, wherein,
the second duty cycle is greater than the first duty cycle; and
the third duty cycle is greater than the second duty cycle.

4. The device of claim 1, wherein each grating of the at least one first, second, and third grating has a same height.

5. The device of claim 1, wherein each grating of the at least one first, second, and third grating comprises sidewall surfaces slanted by an amount relative to the substrate.

6. A device comprising:
one or more regions, each of the regions having one or more gratings formed on a substrate, the gratings of at least one region of the one or more regions comprising:
at least one first grating formed on the substrate having a first refractive index;
at least one second grating formed on the substrate adjacent to the at least one first grating having a second refractive index greater than the first refractive index; and
at least one third of grating formed on the substrate adjacent to the at least one second grating having a third refractive index greater than the second refractive index.

7. The device of claim 6, wherein the first refractive index and second refractive index are between about 1.2 and about 1.7.

8. The device of claim 6, wherein the third refractive index is between about 1.5 and about 2.5.

9. The device of claim 6, wherein,
the at least one first grating comprises a first ratio of a first material to a second material;
the at least one second grating comprises a second ratio of the first material to the second material different than the first ratio; and the at least one third grating comprises a third ratio of the first material to the second material different than the first ratio and second ratio.

10. The device of claim 9, wherein the first material comprises titanium dioxide ($TiO_2$).

11. The device of claim 9, wherein the second material comprises at least one of silicon dioxide ($SiO_2$), silicon oxycarbide (SiOC), and zirconium dioxide ($ZrO_2$).

12. A method comprising:
depositing a first plurality of droplets onto a substrate, each droplet of the first plurality of droplets spaced from each other on the substrate and including one or more first materials;
depositing a second plurality of droplets onto the substrate, each droplet of the second plurality of droplets spaced from each other on the substrate and including one or more second materials;
imprinting a stamp into the first plurality of droplets and the second plurality of droplets;
curing the one or more first materials and the one or more second materials; and
releasing the stamp to form a first grating of the one or more first materials and a second grating of the one or more second materials, the first grating has a first refractive index and a first duty cycle, the second grating has a second refractive index and a second duty cycle, and either:
the first duty cycle is different from the second duty cycle; or
the first refractive index is different from the second refractive index; or
both the first refractive index and the first duty cycle are different from the second refractive index and the second duty cycle.

13. The method of claim 12, wherein the first grating and second grating have substantially equal heights.

14. The method of claim 12, wherein the first grating and second grating comprise sidewall surfaces slanted relative to the substrate.

15. The method of claim 12, wherein the second duty cycle is greater than the first duty cycle.

16. The method of claim 12, where the second refractive index is greater than the first refractive index.

17. The method of claim 16, wherein the one or more first materials comprises a sol-gel or nanoparticle solution comprising at least one of silicon dioxide ($SiO_2$), silicon oxycarbide (SiOC), and zirconium dioxide ($ZrO_2$).

18. The method of claim 17, wherein the sol-gel or nanoparticle solution further comprises titanium dioxide ($TiO_2$).

19. The method of claim 18, wherein the one or more second materials comprises the sol-gel or the nanoparticle solution with a greater proportion of $TiO_2$ than $SiO_2$, SiOC, and ZrO.

20. The method of claim 16, wherein the first refractive index and second refractive index are between about 1 and about 2.5.

* * * * *